(12) United States Patent
Williams

(10) Patent No.: US 10,710,840 B1
(45) Date of Patent: Jul. 14, 2020

(54) MOTORIZED TIE-DOWN DEVICE

(71) Applicant: Henry Williams, Chicago, IL (US)

(72) Inventor: Henry Williams, Chicago, IL (US)

( * ) Notice: Subject to any disclaimer, the term of this patent is extended or adjusted under 35 U.S.C. 154(b) by 0 days.

(21) Appl. No.: 16/357,836

(22) Filed: Mar. 19, 2019

(51) Int. Cl.
*B65H 75/44* (2006.01)
*B60P 7/08* (2006.01)

(52) U.S. Cl.
CPC ........ *B65H 75/4486* (2013.01); *B60P 7/0823* (2013.01); *B65H 2511/10* (2013.01); *B65H 2551/15* (2013.01)

(58) Field of Classification Search
CPC ... B66D 1/46; B66D 1/66; B66D 3/18; B66D 3/26; B60P 3/079; B60P 7/06; B60P 7/0823
See application file for complete search history.

(56) References Cited

U.S. PATENT DOCUMENTS

| 469,383 | A | | 2/1892 | Amrock | |
|---|---|---|---|---|---|
| 2,188,062 | A | * | 1/1940 | Schroder | H01C 21/30 242/390.9 |
| 2,521,191 | A | * | 9/1950 | Stanland | B66D 3/14 254/343 |
| 3,240,473 | A | * | 3/1966 | Coffey | B60P 7/083 410/103 |
| 3,541,888 | A | * | 11/1970 | Day | B66D 1/14 254/357 |
| 3,697,049 | A | * | 10/1972 | Wallace | B66D 1/16 254/343 |
| 4,036,476 | A | | 7/1977 | Douce et al. | |
| 4,489,804 | A | * | 12/1984 | Kamijo | B60R 22/44 180/268 |
| 4,613,273 | A | * | 9/1986 | Wagner | B62D 43/045 224/42.23 |
| 5,295,664 | A | * | 3/1994 | Kamper | B60P 7/083 254/220 |
| 6,085,368 | A | * | 7/2000 | Robert | A61G 7/1015 5/83.1 |
| 6,241,215 | B1 | * | 6/2001 | Gersemsky | A61G 7/1015 254/342 |
| 7,059,588 | B2 | | 6/2006 | Goulet | |
| 7,216,849 | B2 | * | 5/2007 | Tremblay | B60P 7/083 24/69 ST |
| 7,543,798 | B2 | | 6/2009 | Cunningham | |
| 7,857,560 | B2 | | 12/2010 | Leggett et al. | |
| D632,150 | S | * | 2/2011 | Ruan | D8/44 |
| 8,434,979 | B1 | * | 5/2013 | Genge | B60P 7/083 410/103 |
| 9,114,958 | B1 | * | 8/2015 | DiSpazio | B66C 1/34 |
| 2006/0253977 | A1 | * | 11/2006 | Hjort | A61G 7/1015 5/85.1 |

(Continued)

*Primary Examiner* — Emmanuel M Marcelo
(74) *Attorney, Agent, or Firm* — DLA Piper LLP

(57) ABSTRACT

In one aspect, the present disclosure relates to a motorized tie-down device having a housing, a flexible strap having a first end attached to a reel, and a carabiner attached to a second end of the flexible strap. The housing can include a power supply comprising one or more rechargeable batteries, an electric motor coupled to receive power from the power supply, a control to activate the electric motor, the reel, and a worm drive assembly operatively coupled to the electric motor and the reel and configured to transfer rotation from the electric motor to the reel.

15 Claims, 9 Drawing Sheets

(56) References Cited

U.S. PATENT DOCUMENTS

| | | | |
|---|---|---|---|
| 2006/0273292 A1* | 12/2006 | Milam | A61G 7/1026 |
| | | | 254/343 |
| 2009/0020369 A1* | 1/2009 | Warachka | B66F 9/07522 |
| | | | 187/231 |
| 2011/0049450 A1* | 3/2011 | Hager | B66D 1/12 |
| | | | 254/343 |
| 2014/0061556 A1* | 3/2014 | Knox | B60P 7/083 |
| | | | 254/220 |
| 2017/0058998 A1* | 3/2017 | Bujold | B60P 7/0853 |

* cited by examiner

MOTORIZED TIE-DOWN DEVICE

BACKGROUND

Tie-downs are used to secure many types of loads onto vehicles and other support platforms. For example, flatbed trailers are typically equipped with a series of tie-down assemblies along their length. To secure cargo, a trucker may need to extend a series of flexible straps from one side of the trailer to the other and then manually tighten the straps. As another example, consumers may use portable tie-downs to secure purchases to their personal vehicle, such as to the bed of a pickup truck or roof of a sport-utility vehicle (SUV). Having to manually tighten tie-downs can be physically exhausting and time consuming. Existing powered strap winders and automatic take-up winches are designed to be permanently affixed to commercial vehicles and may be too bulky and inflexible for use in many situations.

SUMMARY

According to one aspect of the present disclosure, a motorized tie-down device includes a housing, a flexible strap having a first end attached to a, and a carabiner attached to a second end of the flexible strap. The housing can include a power supply having one or more rechargeable batteries, an electric motor coupled to receive power from the power supply, a control to activate the electric motor, the reel, and a worm drive assembly operatively coupled to the electric motor and the reel and configured to transfer rotation from the electric motor to the reel.

In some embodiments, the housing has a width less than or equal to 3 inches, a length less than or equal to 15 inches, and a height less than or equal to 4 inches. In some embodiments, the device can include a thumbscrew attached to the housing and configured to be screwed down to prevent the reel from rotating. In some embodiments, the control can include a push button. In some embodiments, the housing is formed from a rigid plastic material. In some embodiments, the housing can include a hook configured to secure to a support platform. In some embodiments, the device may include a drive shaft having a first end operatively coupled to the electric motor and a second end operatively coupled to the worm drive. In some embodiments, the device can include a bevel gear operatively coupled to the electric motor and to the drive shaft.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

According to embodiments of the present disclosure, a motorized tie-down device automates the process of tying down cargo to a support platform, such as a flatbed trailer. A hook may be affixed to one end of the device. A flexible strap may extend outward from an opposite end of the device and a carabiner may be attached to an end of the flexible strap. The tie-down device may include a reel around which the strap can be wound, an electric motor and gear assembly to rotate the reel, a portable power supply to power the motor, and one or more controls to control operation of the motor. Various components of the device may be located within a durable housing. The strap may be quickly retracted on a spool within the housing with the push of a button or other control, tightening the strap and securing the a load to vehicle or other support platform. The motorized tie-down device can save a considerable amount of time and effort when winding up and securing valuable cargo, sparing the user from having to operate a ratchet mechanism or hard crank to wind up and tighten the strap.

Figure 1:
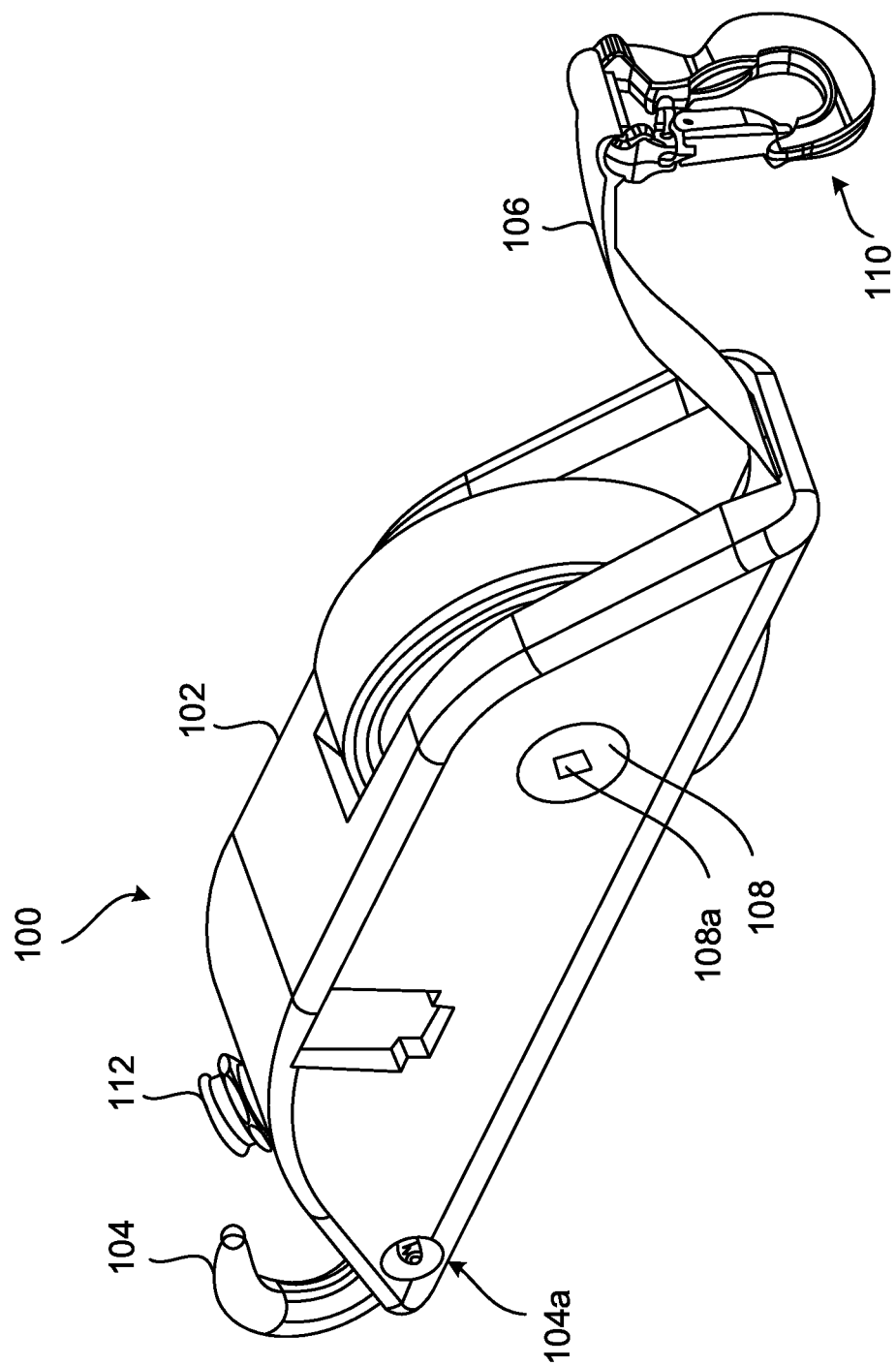
FIGS. 1-4 are perspective views of a motorized tie-down device, according to some embodiments of the present disclosure.

FIGS. 1-4 show a motorized tie-down device, according to embodiments of the present disclosure. As can be seen in FIG. 1, the illustrative device 100 may include a protective housing 102, a first hook attached to a first end of the housing 102, a cargo strap 106 retractably attached to a second end of the housing 102, a reel 108 around which the strap 106 can be wound, and a second hook 110 attached to an end of the strap 106, and a push button 112. Protective housing 102 can be formed, for example, of a metal, hard plastic, or other rigid material. In some embodiments, housing 102 may have a width in the range of 2 to 3 inches (e.g., 2.4 inches), a height in the range of 2 to 4 inches (e.g., 3 inches), and a length in the range of 12 to 16 inches (e.g., 14 inches).

First hook 104 may be fixed to the housing and designed to secure to the edge of a truck, trailer, or other support platform. Second hook 110 may be designed to secure to an opposite side of the support platform. In some embodiments, first hook 104 may be movably attached to the housing 102 such that the position or orientation of the hook relative to the housing 102 can be adjusted by user. For example, first hook 104 may be attached to a rod or pin 104a defining an axis of rotation for the hook 104. First hook 104 and/or second hook 110 may have a shape and dimensions selected to be affixed to a vehicle or other support platform. For example, many trailers include "eye"-type fasteners, rails, or other connection points onto which hooks 104, 110 may be affixed. Second hook 110 may be provided as a carabiner according to some embodiments of the present disclosure. In some embodiments, first hook 104 may be designed to attach to an "eye"-type faster of a vehicle and/or to the second hook 110 (e.g., carabiner).

Cargo strap 106 may be designed to wind around reel 108. Thus, for example, strap 106 may have a substantially flat design and made of a flexible material such as nylon. The length of cargo strap 106 may be selected such that it can be fully wound around 108 reel within the housing 102, allowing it to be stored it in a neat, clean, and tangle-free manner.

Figure 3:
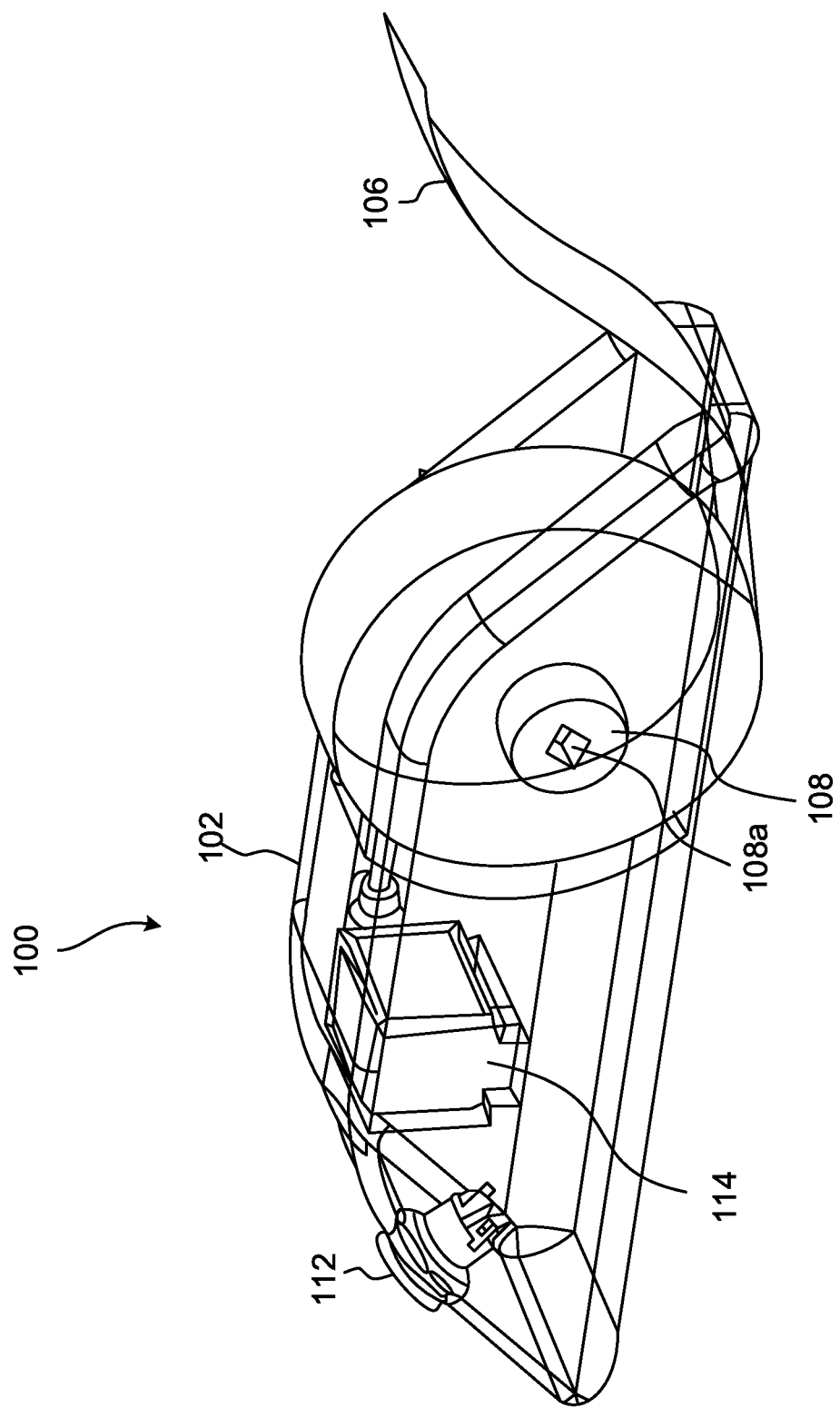
Figure 4:
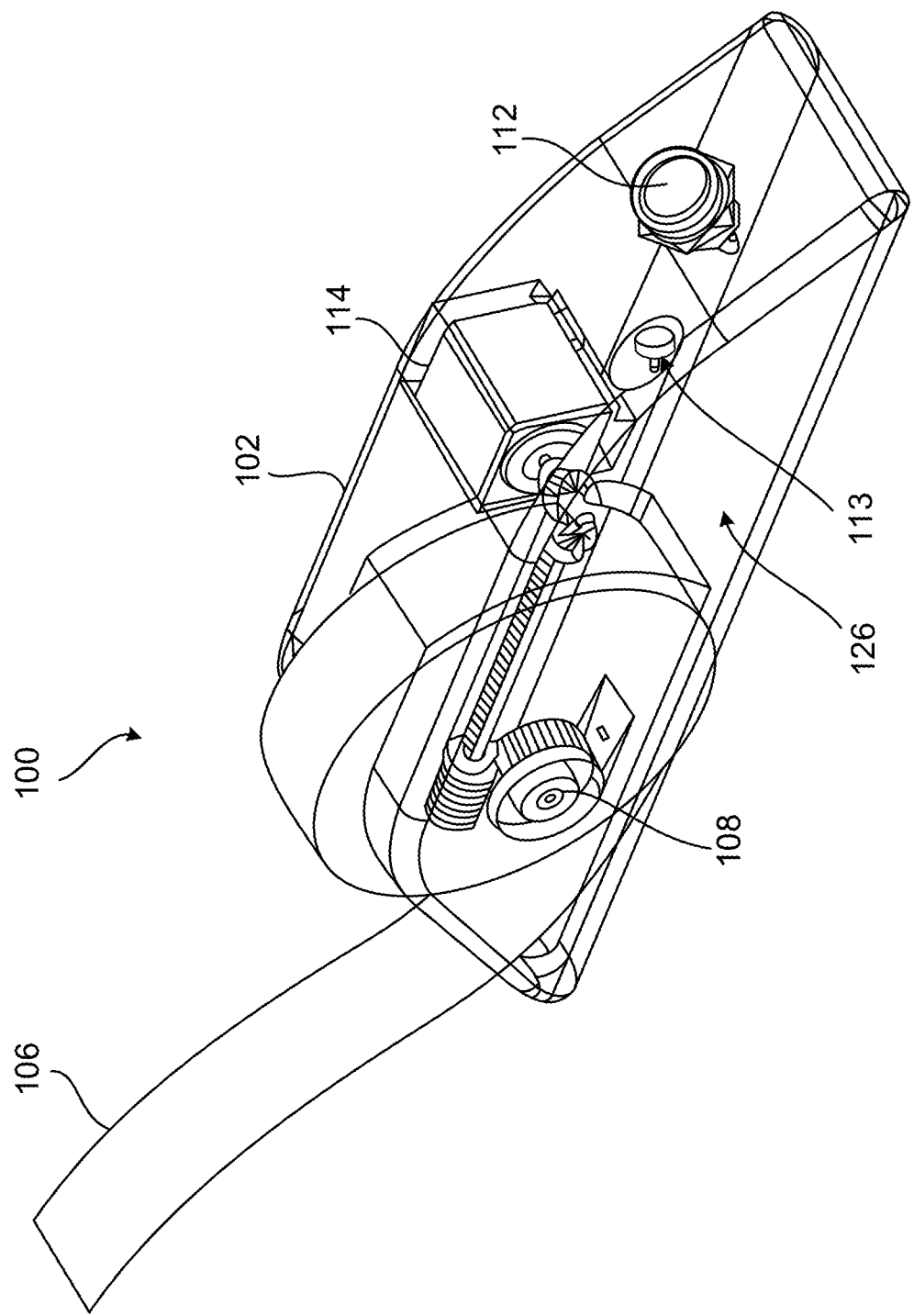

As can be seen in FIG. 3, in some embodiments, reel 108 may include a socket 108a into which a ratchet or other tool may be inserted to manually rotate reel 108, causing the cargo strap 106 to retract into the housing 102 or be release from the housing.

Figure 2:
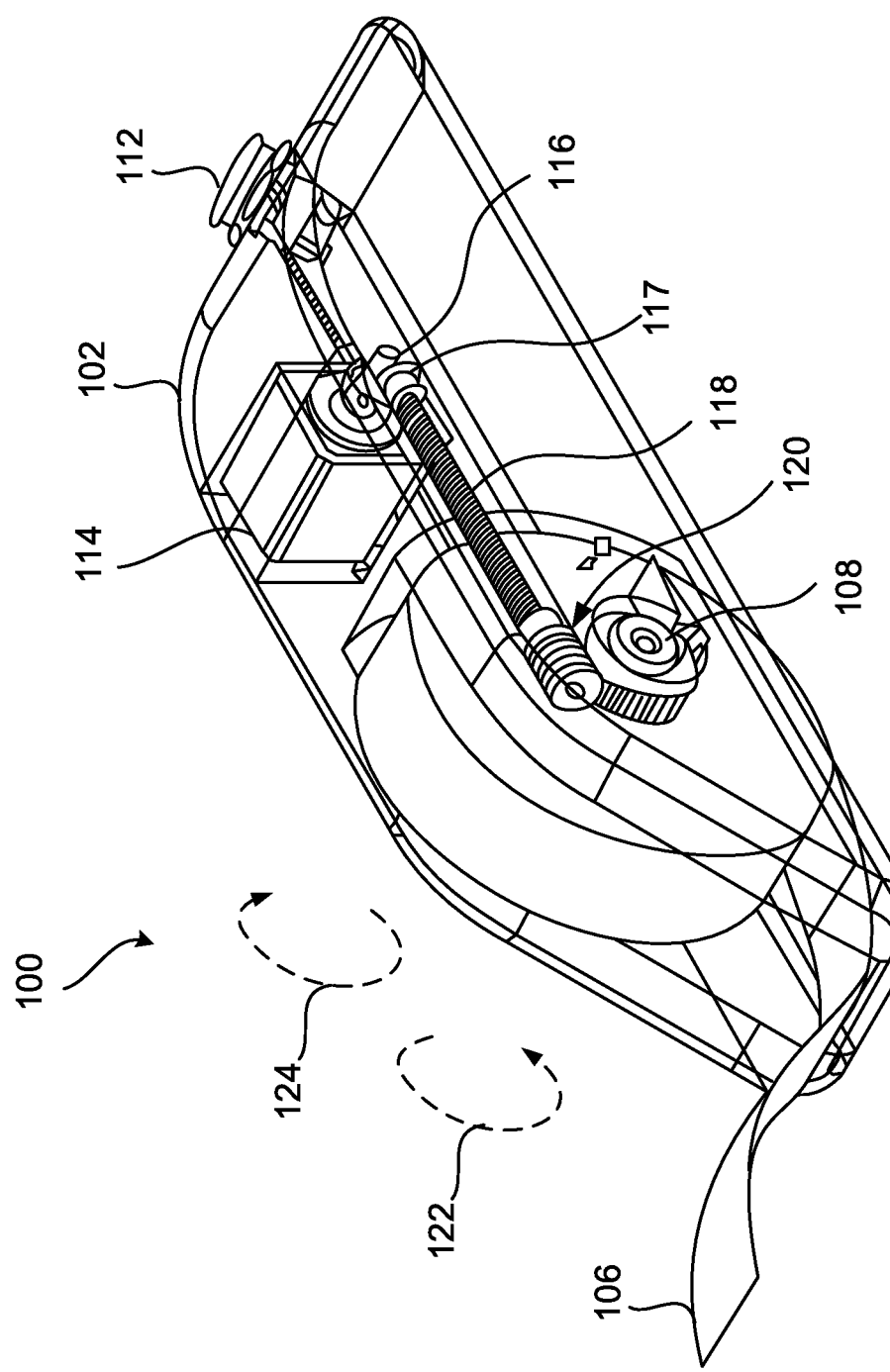
Figure 5:
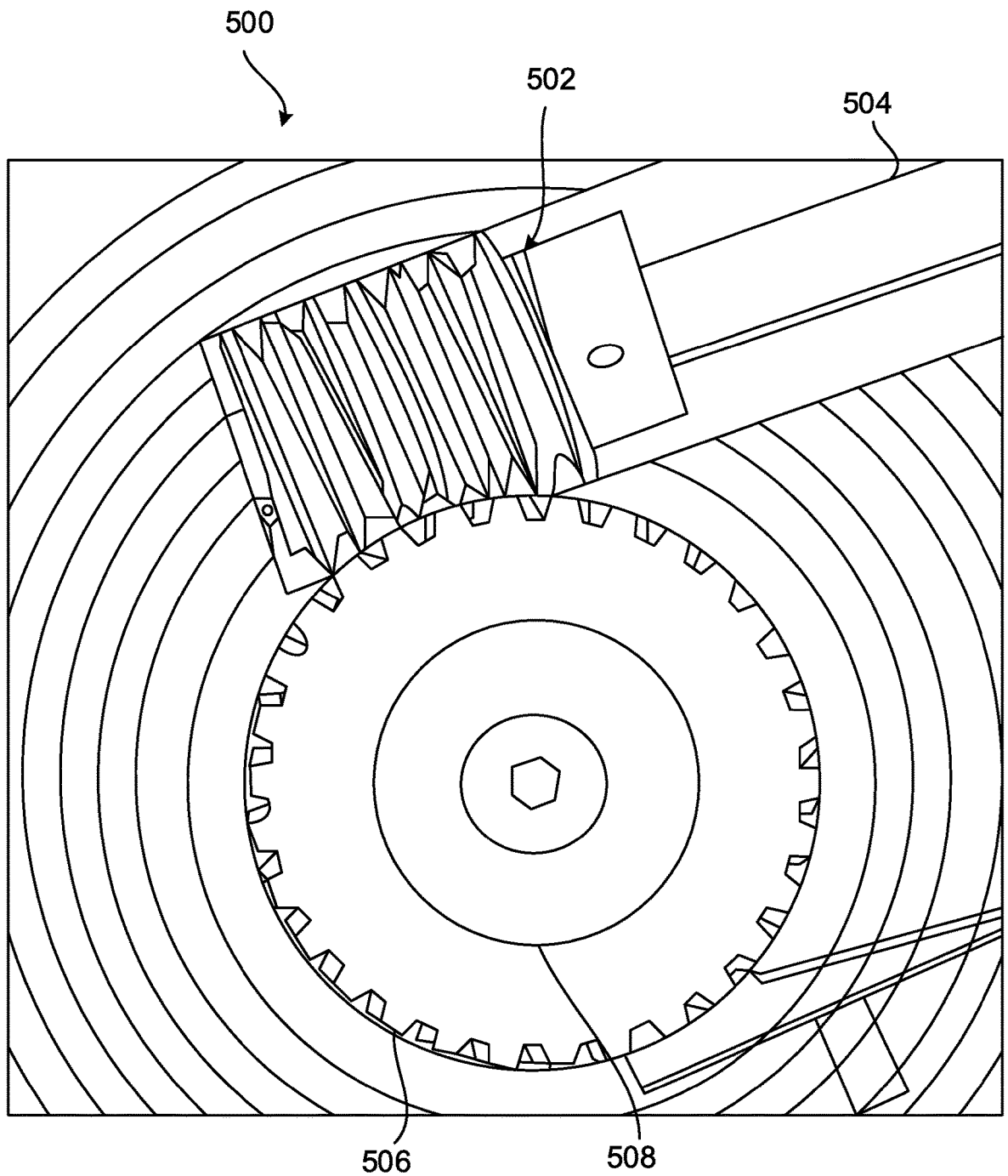
FIG. 5 is side view of a worm drive assembly that may be used within a motorized tie-down device, according to some embodiments of the present disclosure.

As can be seen in FIG. 2, the motorized tie-down device 100 can further include an electric motor 114 and a rechargeable battery electrically coupled to power the motor 114. The battery may include one or more lithium ion batteries. The battery, which is not shown in FIGS. 1-4, may be located along the lower portion of the housing 102, for example in the region 126 denoted in FIG. 4. The electric motor 114 can be mechanically coupled to the reel 108 via one or more gears assemblies such that operation of the motor 114 causes the reel 108 to rotate, and further causes strap 106 to wind around the reel 108 and retract into the housing 102. For example, the motor's axle 116 may be coupled to a drive shaft 118 via a bevel gear 117, and drive shaft 118 may be coupled to reel 108 via a worm drive 120. An example of a worm drive 120 is shown in FIG. 5. Motor 114 and gear assemblies 116, 117, 118, 120 may be configured to rotate reel 108 to in a direction 122, in turn causing strap 106 to wind around the reel 108 and retract into the housing 102.

Push button 112 may be electrically coupled to the electric motor 114 and configured to control the operation of the motor 114. For example, push button 112 may be part of an electric circuit connecting the electric motor 114 to the rechargeable battery. In a default position, push button 112 may create a break in the circuit preventing current flow to motor 114. When depressed by a user, push button 112 may cause the circuit to become closed allowing current flow to the motor 114. While the embodiments shown in FIGS. 1-4 are shown and described as having push buttons, a skilled artisan will understand that other types of mechanical user controls could be used instead.

In some embodiments, device 100 may include a second push button (not shown) electrically coupled to the electric motor 114 and configured to drive the motor in an opposite direction relative to that of first push button 112. This, in turn, can cause reel 108 to rotate in a direction 124, thereby causing strap 106 to be released from housing 102. In some embodiments, a user may manually pull the strap 106 from the housing. For example, device 100 may include a mechanical release to allow reel 108 freely rotate in direction 124, allowing strap 106 to be pulled out of the housing 102. In some embodiments, the device may include a single push button (e.g., push button 112) or other mechanical control configured to both retract and release the cargo strap 106.

In some embodiments, device 100 can include a mechanical device to lock and unlock one or more of the gear assemblies 116, 117, 118, 120 into place. For example, device 100 can include a thumbscrew 113 which the user can turn in a first direction ("screwed down" to prevent reel 108 from rotating in either direction, thereby ensuring constant tension on a cargo load. The user can turn the thumbscrew 113 in the opposite direction ("screwed up") to allow reel 108 to rotate again. The thumbscrew 113 can be positioned on the housing 102 and configured to contact (and thus lock) any one of the gear assemblies 116, 117, 118, 120 when the thumbscrew 113 is screwed down.

As discussed above, in some embodiments, device 100 may include a rechargeable battery (or other type of portable power supply) to power motor 114. This provides portability and allows device 100 to be used in various commercial and consumer settings. For example, a user could locate device 100 on a rack mounted behind the cab of a pickup truck (sometimes referred to as a "headache rack"). In other embodiments, device 100 may be configured to receive power from an external power source, such as a vehicle's battery.

In operation, a user can attach first hook 104 (FIG. 1) to a support platform, such as to the edge of a truck or training. The user can release cargo strap 106 from the housing 102 and place the strap 106 over cargo to be secured. The user may release cargo strap 106 by pulling it away from housing 102 and/or by using a push button or other mechanical control. The user can attach second hook 110 (FIG. 1) to an opposite side of the support platform. The user can then engage push button 112, causing the strap to wind and retract into the housing 102 in a smooth and controlled manner. As the strap retracts into the housing 102, the cargo is secured to the support platform. In some embodiments, the user may screw down a thumbscrew 113 or use another mechanical device provided on the device 100 to prevent reel 108 from rotation, thereby ensuring constant tension on the cargo strap 106.

In some embodiments, device 100 may include a sensor to detect the amount of tension on the cargo strap 106. The output of the sensor can be used to automatically stop the electric motor 114 when the strap's tension exceeds a maximum tension threshold to avoid over tightening the strap and causing damage to the device 100 or the cargo. In some embodiments, the output of the tension sensor can be used to automatically start the motor 114 when the strap's tension falls below a minimum tension threshold, allowing the device 100 to "auto tighten" the strap in the event it becomes slack during transport of the cargo.

FIG. 5 shows a worm drive assembly that can be used within a motorized tie-down device (e.g., device 100 of FIGS. 1-4), according to some embodiments of the present disclosure. The illustrative worm drive assembly 500 includes a worm 502 affixed to a shaft 504 and in operative contact with a worm wheel 506. The worm wheel 506 may be fixedly attached to a reel 508. Thus, rotation of shaft 504 (e.g., from an electric motor) can cause rotation of reel 508 for winding/unwinding a cargo strap.

Figure 6:
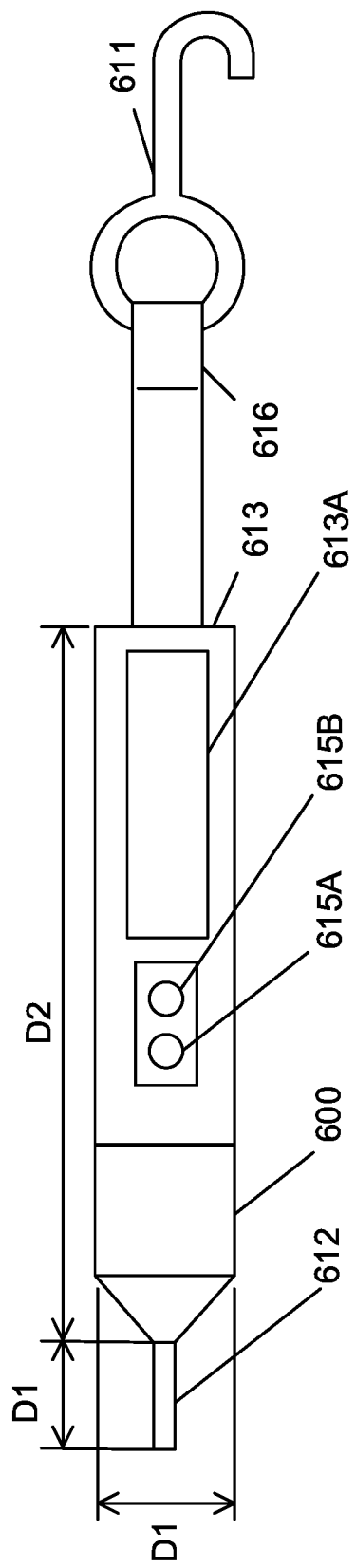
FIG. 6 is a top view of a motorized tie-down device, according to some embodiments of the present disclosure.
Figure 7:
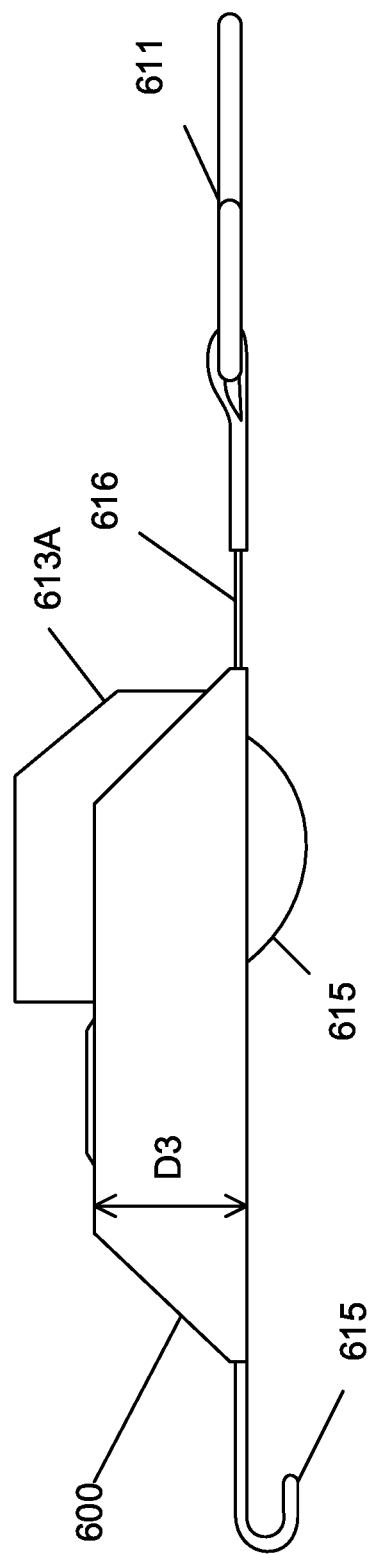
FIGS. 7 and 8 are side views of the motorized tie-down device of FIG. 6.
Figure 8:
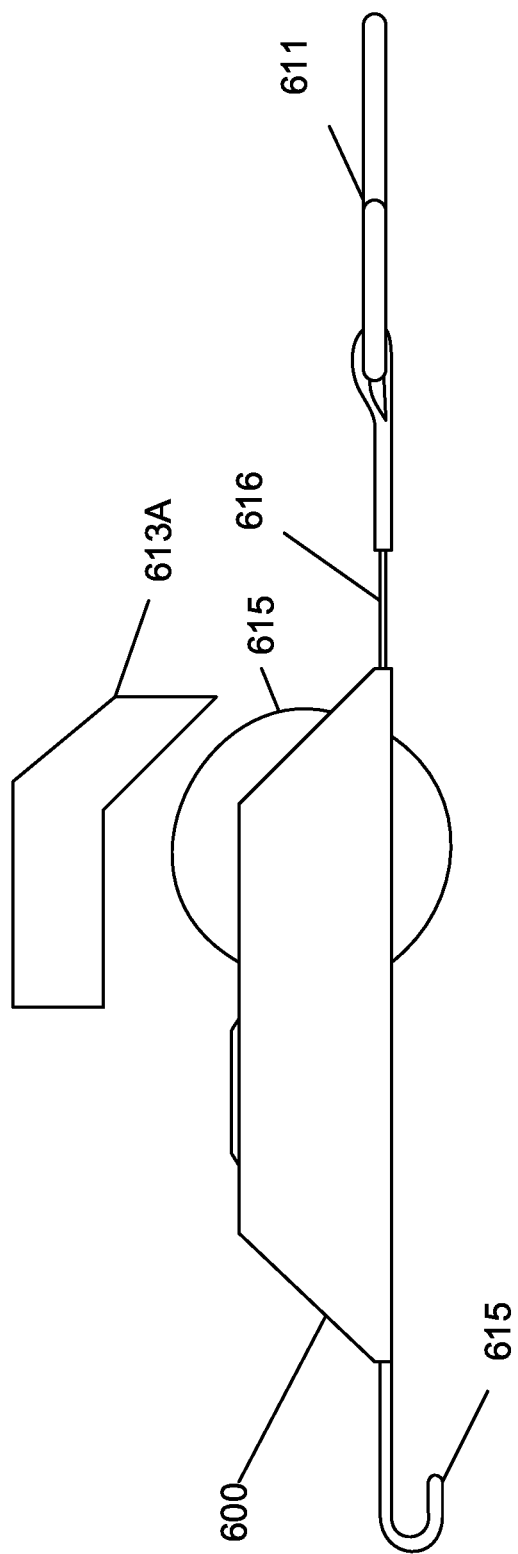
Figure 9:
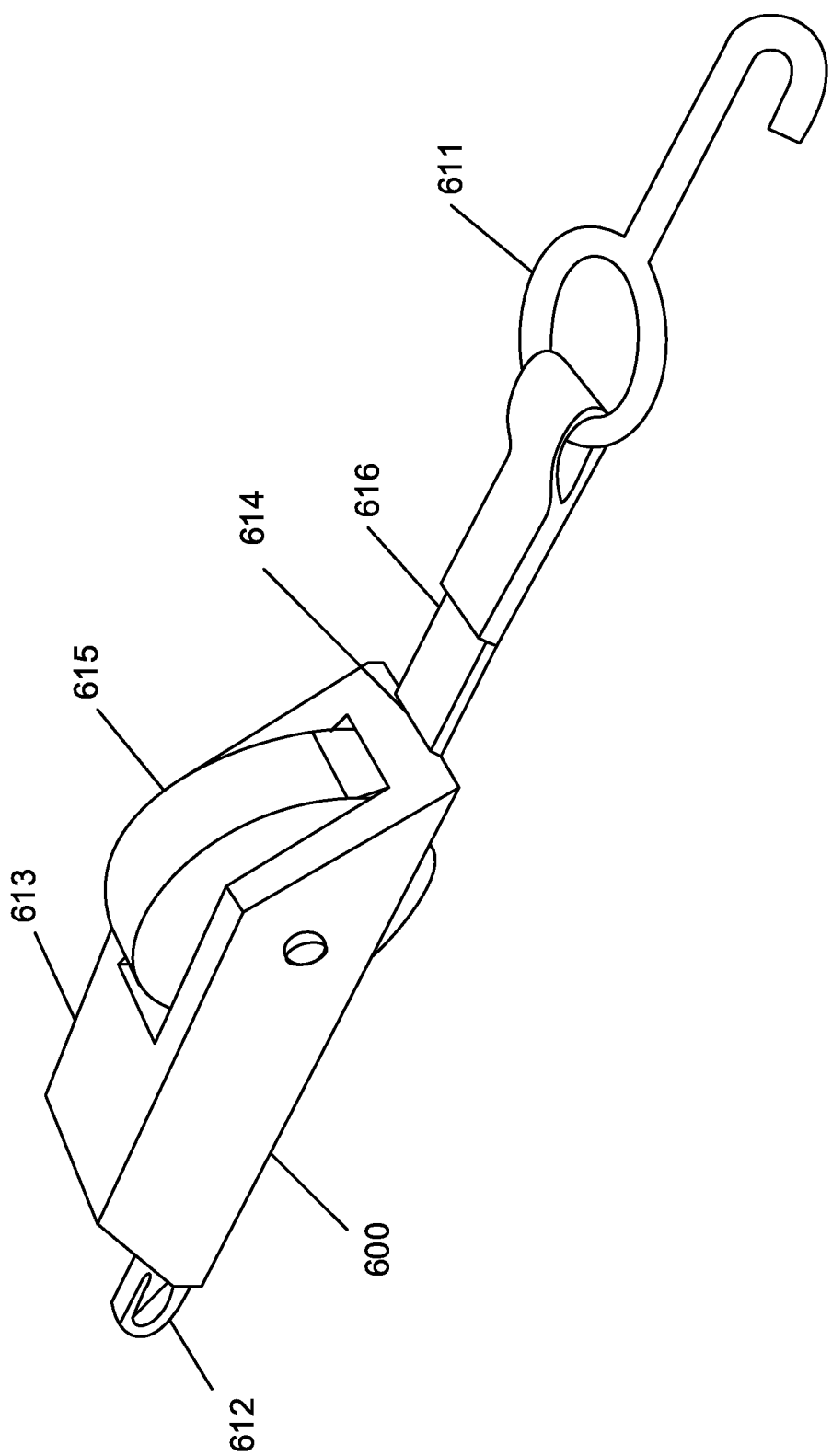
FIG. 9 is a perspective view of the motorized tie-down device of FIG. 6.

FIGS. 6-9 show a motorized tie-down device, according to some embodiments of the present disclosure. The illustrative device 600 can include a housing 613 that encloses an electric motor and one or more rechargeable batteries (not shown). The device can include a nylon strap 616 which coils on a retractable spool 615 within the housing 613 and extends out of an aperture 614 (FIG. 9) on the front surface of the housing 613, terminating in a carabiner 611 or similar hook. The housing 613 may include a removable cover 613A with a tight-fitting rim to protect the upper portion of the spool 615 and the coiled portion of the strap 616. The strap 616 may include a nylon webbing that can be color-coded to indicate its rating for different load capacities The device 600 may include a flexibly mounted hook 612 mounted at the center of the rear surface of the housing 613. The hook 612 may be designed to be affixed the edge of a cargo support platform. As shown in FIG. 6, housing 613 can have a width D1 of about 2.5 inches, a length D2 of about 12 inches, and a height D3 of about 3 inches. Hook 612 may have a length D4 of about 3 inches.

A retraction button 615A can be provided on the top surface of the housing 613. When pressed, retraction button 615A can activate the motor and causes the strap 616 to retract. A release button 615B may also be provided, for example, next to the retraction button 615A. When neither the retraction button nor the release button 615B is pressed, spool 615 may be locked and will not turn. When pressed, release button 615B may deactivate the locking mechanism and allows the spool 615 to turn freely in both directions until the release button 615B is released, activating the lock.

In some embodiments, a key fob and a combination of radio frequency (RF) transmitters and receivers are provided, enabling a user to tighten the straps 616 on multiple tie-downs to keep the load secured on a support platform, such as flatbed trailer. Thus, for example, a truck driver can remotely tighten the straps while sitting in the driver's seat and driving down the road.

In an example application, a user may affix the hook 612 to a rail or similar protrusion at the edge of the support platform. The user may then pull the strap 616 out of the housing 613 through the aperture 614, extend the strap over a load of cargo and a tarpaulin covering the cargo, and affix the carabiner 611 to another rail or other protrusion on the opposite edge of the support platform. The user can then retract and tighten the strap 616 by pressing the retraction button 615A. This can causes strap 616 to retract onto spool 615, tightening the strap and securing the cargo.

In some embodiments, carabiner 611, hook 612, housing 613, and cover 613A may be manufactured from rigid, durable materials which is corrosion resistant, such as stainless steel, brass, or aluminum alloy. Spool 615 may be manufactured from rigid, durable materials such as steel, aluminum alloy, and plastic. Retraction button 615A and release button 615B can be manufactured from a flexible, durable material such as plastic or polymer, according to some embodiments. Strap 616 may be manufactured from a flexible, durable material such as nylon fabric. Components, component sizes, and materials listed above are preferable, but artisans will recognize that alternate components and materials could be selected without altering the scope of the invention.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A motorized tie-down device comprising:
a housing comprising:
a power supply comprising one or more rechargeable batteries;
an electric motor coupled to receive power from the power supply;
a control to activate the electric motor;
a reel;
a hook configured to secure to a support platform;
a thumbscrew configured to be screwed down to prevent the reel from rotating; and
a worm drive assembly operatively coupled to the electric motor and the reel and configured to transfer rotation from the electric motor to the reel;
a flexible strap having a first end attached to the reel; and
a carabiner attached to a second end of the flexible strap.

2. The device of claim 1 wherein the housing has a width less than or equal to 3 inches, a length less than or equal to 15 inches, and a height less than or equal to 4 inches.

3. The device of claim 1 wherein the control comprises a push button.

4. The device of claim 3, wherein the push button is a first push button, the device further comprising a second push button configured to drive the electric motor in an opposite direction relative to that of the first push button.

5. The device of claim 1 wherein the housing is formed from a rigid plastic material.

6. The device of claim 1 comprising a drive shaft having a first end operatively coupled to the electric motor and a second end operatively coupled to the worm drive.

7. The device of claim 6 comprising a bevel gear operatively coupled to the electric motor and to the drive shaft.

8. The device of claim 1, wherein the hook is movably attached to the housing.

9. The device of claim 8, wherein a position or orientation of the hook relative to the housing can be adjusted by the user.

10. The device of claim 9, wherein the hook is attached to a rod or pin defining an axis of rotation for the hook.

11. The device of claim 1, wherein the reel includes a socket into which a ratchet or other tool can be inserted to manually rotate the reel.

12. The device of claim 1, further comprising a sensor configured to detect an amount of tension on the flexible strap.

13. The device of claim 12, wherein an output of the sensor causes the electric motor to automatically start when the amount of tension on the flexible strap falls below a minimum tension threshold.

14. The device of claim 1, wherein the housing includes a removable cover configured to protect a portion of the flexible strap.

15. The device of claim 1, further comprising a radio frequency (RF) receiver configured to receive a command to remotely tighten the flexible strap from a remote RF transmitter.

* * * * *